(12) United States Patent
Braun et al.

(10) Patent No.: US 7,880,039 B2
(45) Date of Patent: Feb. 1, 2011

(54) PRODUCTION OF CARBONYL FLUORIDE

(75) Inventors: Max Braun, Wedemark (DE); Johannes Eicher, Sehnde-Ilten (DE)

(73) Assignee: Solvay Fluor GmbH, Hannover (DE)

( * ) Notice: Subject to any disclaimer, the term of this patent is extended or adjusted under 35 U.S.C. 154(b) by 135 days.

(21) Appl. No.: 10/591,783

(22) PCT Filed: Feb. 9, 2005

(86) PCT No.: PCT/EP2005/001281

§ 371 (c)(1),
(2), (4) Date: Dec. 6, 2006

(87) PCT Pub. No.: WO2005/085129

PCT Pub. Date: Sep. 15, 2005

(65) Prior Publication Data

US 2007/0197826 A1 Aug. 23, 2007

(30) Foreign Application Priority Data

Mar. 8, 2004 (EP) .................................. 04005421

(51) Int. Cl.
C07C 19/08 (2006.01)
C07C 21/18 (2006.01)
C07C 51/58 (2006.01)

(52) U.S. Cl. ......................... 570/140; 570/134; 562/851

(58) Field of Classification Search .................... None
See application file for complete search history.

(56) References Cited

U.S. PATENT DOCUMENTS 6,489,510 B1 12/2002 Braun et al.

FOREIGN PATENT DOCUMENTS

EP 0 310 255 4/1989
WO WO-98/28351 7/1998
WO WO-01/34667 5/2001

OTHER PUBLICATIONS

Shi et al., Youji Huaxue (1988), 8(1), 48-50.*
Kuzmenko et al., Zhurnal Fizicheskoi Khimii (1989) 63(7), 1911-12.*
Tuazon et al., Journal of Atmospheric Chemistry 17:179-199, 1993.*
Kuz'Menko, V.A., "Reactions of Carbon Difluoride and Oxygen. Chlorine Catalysis", Zhurnal Fizicheskoi Khimii 63:7 (1989), See Database Chemabs, Chemical Abstracts Service, Database Accession No. 112:14054, XP002296381.
Zhong, J. et al., "The Photolysis Characteristics of HCFC-22 in Presence of Hydrogen Peroxide", Huanjing Kexue 17:3 (1996), See Database Chemabs, Chemical Abstracts Service, Database Accession No. 126:218375, XP002296382.
Komarov, V. et al., "Reaction of Ozone with Halogen-Substituted Saturated Hydrocarbons", Kinetika I Kataliz 21:2, See Database Chemabs, Chemical Abstracts Service, Database Accession No. 93:132037, XP002296383, 1980.
Brownsword, R. A. et al., "Photodissociation Dynamics of $CHF_2Cl$ after Photoexcitation at the Lyman-$\alpha$Wavelength (121.6 nm)", J. Phys. Chem. A 101 (1997), pp. 995-999.
Edney, E.O. et al., "Chlorine Initiated Photooxidation Studies of Hydrochlorofluorocarbons (HCFCs) and Hydrofluorocarbons (HFCs): Results for HCFC-22 ($CHClF_2$); HFC-41 ($CH_3F$); HCFC-124 ($CClFHCF_3$); HFC-125 ($CF_3CHR_2$); HFC-134a ($CF_3CH_2F$); HCFC-142b ($CClF_2CH_3$); and HFC-152a ($CHF_2CH_3$)", International Journal of Chemical Kinetics 24 (1992), pp. 1067-1081.
Atkinson, R. et al., "Tropospheric and Stratospheric Sinks for Halocarbons: Photooxidation, O ($^1D$) Atom, and OH Radical Reactions", Journal of Geophysical Research 81:33 (1976), pp. 5765-5770.
Neve de Mevergnies, M., "Vibrational Photochemistry of Fluoroform Induced by $CO_2$ Laser Pulses", Infrared Phys. 25:1/2 (1985), pp. 175-189.
Kojima, M. et al., "Photolysis of $CO_2$ with 158 nm (F2) Laser. Reactivity of O ($^1D$) with $CH_4$, $CF_3H$, and $CF_3CH_3$", Chemistry Letters (1992), pp. 1309-1312.

* cited by examiner

*Primary Examiner*—Karl J Puttlitz
(74) *Attorney, Agent, or Firm*—Connolly Bove Lodge & Hutz LLP

(57) ABSTRACT

Carbonyl fluoride, which can also be used as an etching gas, can be prepared by photochemical oxidation of chlorodifluoromethane or trifluoromethane with light, for example with light of a wavelength $\geq 280$ nm in the presence of chlorine.

16 Claims, No Drawings

PRODUCTION OF CARBONYL FLUORIDE

RELATED APPLICATIONS

This application is a national stage application (under 35 U.S.C. 371) of PCT/EP2005/001281 filed Feb. 9, 2005, which claims benefit of European application 04005421.5 filed Mar. 8, 2004.

The invention relates to the preparation of carbonyl fluoride (fluorophosgene) by photochemical oxidation.

Carbonyl fluoride has been proposed as a new etching gas for the cleaning of CVD reactors. Industrial preparation is possible by heating a monohalodifluoromethane; see EP-A-0 310255. Scientific publications have also described the photochemical oxidation of chlorodifluoromethane in the presence of chlorine; see E. O. Edney and D. J. Driscoll, Int. Journal of Chemical Kinetics, vol. 24(1992), pages 1067 to 1081. The content of HCFC-22 in the irradiation cell was within the ppm range; the pressure was 700 torr. The aim was to obtain information about the tropospheric decomposition of various halohydrocarbons.

In the publication of V. A. Kuzmenko in Zhurnal Fizicheskoi Khimii 63 (1989), pages 1911 and 1912, an IR laser was used to irradiate a mixture which comprised HCFC-22, oxygen and chlorine.

In the Journal of Geophysical Research 81 (1976), pages 5765 to 5770, R. Atkinson, G. M. Breuer, J. N. Pitts, jr. and H. L. Sandoval describe the photooxidation of HCFC-22 with regard to the behaviour of this compound in the troposphere and stratosphere. The reaction was carried out at low pressure and in the presence of nitrogen dioxide and optionally $N_2O$ for a period of 20 to 80 hours.

Other authors have described the photooxidation of HCFC-22 in the presence of hydrogen peroxide.

It was an object of the present invention to specify a technically advantageously performable process for preparing carbonyl fluoride, $C(O)F_2$. This object is achieved by the process of the present invention.

The process according to the invention envisages the preparation of $C(O)F_2$ by photooxidizing $CHClF_2$ or $CHF_3$ with oxygen. The radiation sources used are preferably not laser radiators, but rather preference is given to using incident light which does not consist of a single wavelength but rather has a spectral range which encompasses at least 50 nm (i.e. the light fraction with the lowest wavelength and the light fraction with the highest wavelength are at least 50 nm apart). At least some of the radiation is preferably in the range from 280 nm up to the long-wavelength end of visible light, i.e. up to about 750 nm. However, this does not mean that radiation has to be released continuously over the entire range. In this context, the term "light" is not utilized such that it is restricted to "visible light"; it also encompasses radiation outside the range of visible light.

The use of $CHClF_2$ (HCFC-22) is preferred and serves for the further illustration of the invention.

The pressure in the reactor corresponds preferably at least to ambient pressure, i.e. 1 bar (abs.). It can also be higher. The pressure is preferably in the range from 1 bar (abs.) to 11 bar (abs.). The temperature is preferably in the range from 20 to 300° C., particularly in the range from 30 to 300° C., in particular in the range from 30 to 90° C. and very particularly in the range from 50 to 90° C. Advantageously, the conditions with regard to pressure and temperature are selected such that the reaction mixture remains gaseous.

Very particular preference is given to working under pressureless conditions. In the context of the present invention, the term "pressureless" means that no additional pressure acts on the reaction mixture apart from the ambient pressure (i.e. about 1 bar), the delivery pressure of the halohydrocarbon starting compound and of the oxygen gas (or of the oxygenous gas; for example, air or oxygen/inert gas mixtures can be used) and of any chlorine used, and also any pressure which builds up as a result of hydrogen chloride gas formed in the reaction. The total pressure in the reactor is then appropriately less than 2 bar absolute, or even less than 1.5 bar absolute depending on the delivery pressure, but greater than ambient pressure.

Unlike in the prior art, HCFC-22 is present in the present invention not in the ppm range but rather in a significant amount in the reactor. Thus, its content in the reaction mixture is preferably at least 5 mol %, preferably at least 10 mol %.

The process can be carried out batchwise or preferably continuously. The procedure is preferably to feed starting material (the appropriate starting compound, an oxygen-containing gas such as air or pure oxygen and optionally chlorine) continuously into a flow apparatus and to draw off reaction product or reaction mixture continuously in accordance with the amount fed in. The average residence time in the reaction vessel is advantageously between 0.01 and 30 minutes, preferably between 0.1 and 3 minutes, more preferably between 0.3 and 1.5 minutes. The optimal average residence time, which is dependent upon factors including the type of lamps, the radiation output of the lamps and upon geometric parameters of the irradiation apparatus, can be determined by simple manual experiments and analysis of the product stream, for example by gas chromatography. It may also be advantageous to swirl the reaction mixture thoroughly, for example by means of suitable internals in the reactor. The optimal residence time in the case of batchwise performance can be determined in the same way.

The process can be carried out in two preferred embodiments, specifically in the absence of chlorine or, preferably, in the presence of chlorine as an initiator. In the presence of chlorine as an initiator, it is desirable not to allow a particular wavelength range, specifically that below 280 nm, to act on the reaction mixture. Both embodiments are illustrated below.

One embodiment thus envisages the photooxidation in the absence of chlorine or other free-radical initiators or activators. For example, the irradiation can be undertaken through quartz glass; other components of the reactor which are not arranged between light source and reaction mixture can of course be made of any components, for example even of borosilicate glass (which filters certain radiation fractions; see below). Suitable radiators include customary radiators which, for example, release radiation in the range from 250 to 400 nm or even up to 600 nm (the spectrum may also extend beyond the upper or lower limit, for example up to the region of visible light, about 750 nm). In the absence of chlorine, it is uncritical when light below 280 nm acts on the reaction mixture.

A further preferred embodiment envisages irradiation in the presence of elemental chlorine with irradiation with light of a wavelength of $\geq 280$ nm, in which case not more than 0.5 mol of elemental chlorine is present in the reaction mixture per mole of $CHClF_2$. Preference is given to using 0.01 to 0.50 mol of chlorine, preferably 0.03 to 0.25 mol, in particular 0.05 to 0.20 mol of elemental chlorine per mole of $CHClF_2$.

Hydrogen peroxide, ozone or nitrogen oxides such as $N_2O$ or $NO_2$ are preferably not added to the reaction mixture.

Conversion rate, yield and selectivity are particularly high when HCFC-22 and oxygen are converted in the presence of elemental chlorine and activating irradiation is undertaken with light of wavelength $\lambda \geq 280$ nm. Frequencies of wavelength below 280 nm are then essentially masked out of the frequency spectrum. This can be brought about by using irradiation lamps which emit only light of a wavelength above or at 280 nm, and/or means of masking out the frequencies below 280 nm from the light emitted are used. For example, it is possible to irradiate through glass which is transparent only to light of a wavelength of 280 nm or higher, i.e. filters out the shorter-wavelength radiation fraction. Suitable glasses for this purpose are, for example, borosilicate glasses. Suitable glasses contain, for example, 7 to 13% $B_2O_3$, 70 to 80% $SiO_2$, and also 2 to 7% $Al_2O_3$ and 4 to 8% $Na_2O+K_2O$, and also 0 to 5% alkaline earth metal oxides (in each case % by weight). Known brands of borosilicate glasses are Duran, Pyrex and Solidex.

For the irradiation, irradiation lamps which emit only (UV) light of wavelength $\geq 280$ nm are particularly suitable. Especially fluorescent tubes (for example from Philips) are very suitable. It is possible with such lamps to undertake the irradiation through quartz glass, but also through the above-described glasses which filter out the relatively short-wavelength radiation fraction. A prerequisite is of course that the lamps or tubes used also emit in the absorption range of elemental chlorine. In addition to the particularly suitable fluorescent tubes, it is also possible, for example, to use irradiation lamps (for example medium- or high-pressure mercury radiators); any lines in the region below 280 nm are then filtered out, for example by irradiating through a glass which is transparent only to light of a wavelength at and above 280 nm. Usable glasses are described above. Also very suitable are lamps, for example high-pressure mercury lamps, which, owing to a dopant, emit predominantly or only within the preferred wavelength range at and above 280 nm. High-pressure mercury radiators, for example, have a quite intense band in the region of 254 nm, which, as described above, can be filtered out, for example by borosilicate glass. In the case of high-pressure mercury radiators doped by metal iodides, this line is highly suppressed. The often greater-than-proportional increase in the conversion rate when such doped radiators are used is surprising. Particularly suitable radiators are high-pressure mercury radiators which are doped with gallium iodide, in particular thallium iodide or cadmium iodide. When such doped radiation lamps are used, the relatively short-wavelength radiation fraction with $\lambda < 280$ nm is also filtered out, for example by working in borosilicate glass.

The molar ratio between the starting compound and oxygen may vary within a wide range, but at least 0.4 mol of oxygen per mole of starting compound is appropriately used. The oxygen may also be used in excess. Particularly good results are achieved when the molar ratio between the starting compound and the oxygen is in the range from 1:0.4 to 1:5, preferably from 1:0.4 to 1:1, in particular from 1:0.4 to 1:0.9. As stated, the oxygen can be used in the form of air. Preference is given to using the oxygen in the form of an $O_2$/inert gas mixture, but in particular as pure oxygen. In relation to the product purity, it is desirable that a minimum amount of water is present in the reaction (for example less than 30 ppm). If desired, the reactants can be freed of entrained water in a known manner, for example by means of molecular sieve.

The advantage of the process according to the invention is the high selectivity and yield.

The examples which follow illustrate the invention without restricting it.

EXAMPLE 1

Preparation of Fluorophosgene ($COF_2$) by Photochemical Reaction

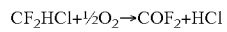  Reaction equation

Batch size: see particular experiments

Experimental Procedure and Setup

The reaction chamber used was a reactor manufactured from Duran glass having a capacity of 580 ml, which had a cooling finger (Duran) and a lamp shaft (quartz glass). The gas was introduced through a glass frit which was at the bottom of the reactor. The high-pressure mercury vapour radiator was cooled with compressed air.

At the start of the experiment, the compressed air cooling was first switched on and then the lamp was ignited. After approx. 10 min, the radiator has attained its output (500 or 700 watts). The introduction of the gases was now commenced. First, the introduction of HCFC-22 (R 22) was started, then the introduction of chlorine, and finally also the introduction of oxygen, so that all three reactants were fed into the reactor.

All gases were then metered in simultaneously in a certain ratio and passed through the reactor chamber. ("A small amount of chlorine" means about 0.12 mol/h of chlorine per 1 mol/h of $CHF_2Cl$). The resulting product gas stream was passed through a wash bottle (filled with approx. 5% $H_2O_2$ solution), in order to scavenge the excess chlorine and convert it to HCl. The samples of the product gas stream were withdrawn upstream of the wash bottle.

Experiment 1

Batch: 0.5 mol of R22/h
 0.5 mol of $O_2$/h
 a small amount of $Cl_2$

Procedure: lamp output at 700 watts

| Sample and time (7:10 start) | R22 (in g) | R22 mol/h | Cl2 (in g) | Cl2 mol/h | O2 (in g) | O2 mol/h | Residence time in the reactor (in min) |
|---|---|---|---|---|---|---|---|
| 07:30 | 17.2 | 0.6 | 2 | 0.08 | 4.8 | 0.5 | 1.23 |
| 07:45 | 37.7 | 0.9 | 2.7 | 0.04 | 9.6 | 0.6 | 0.94 |
| 08:10 | 54.6 | 0.5 | 4.8 | 0.07 | 14.6 | 0.4 | 1.49 |

Analysis Evaluation of the Gas Samples (all Analyses Calculated Without Air):

Sample:

| at 7.45: | 45.1% $COF_2$ | at 8.10: | 24.5% $COF_2$ |
|---|---|---|---|
| | 44.2% HCl | | 23.7% HCl |
| | 8.6% $CO_2$ | | 10.9% $CO_2$ |
| | 1.8% R12 | | 3.9% R12 |
| | 0.3% $H_2O$ | | 37.0% R22 |

Experiment 2

Batch: 0.5 mol of R22/h
  0.5 mol of $O_2$/h
  a small amount of $Cl_2$

Procedure: lamp output at 500 watts

| Sample and time 7:30 start | R22 (in g) | R22 mol/h | Cl2 (in g) | Cl2 mol/h | O2 (in g) | O2 mol/h | Residence time in the reactor (in min) |
|---|---|---|---|---|---|---|---|
| 07:50 | 20.7 | 0.7 | 1.8 | 0.08 | 5.8 | 0.5 | 1.13 |
| 08:45 | 80 | 0.6 | 3.8 | 0.03 | 21.7 | 0.5 | 1.28 |
| 09:45 | 130.8 | 0.6 | 11.3 | 0.1 | 38.9 | 0.5 | 1.21 |
| 11:15 | 220.3 | 0.7 | 14.2 | 0.03 | 56.9 | 0.4 | 1.28 |
| 12:00 | 264.5 | 0.7 | 18.3 | 0.08 | 75.8 | 0.8 | 0.92 |
| 13:00 | 303.7 | 0.5 | 22.0 | 0.1 | 84.4 | 0.3 | 1.71 |
| 13:30 | 342.9 | 0.9 | 0 | 0 | 97.9 | 0.8 | 0.85 |

Analysis Evaluation: (all Analyses Calculated Without Air, Excluding the Sample at 13.30):
Sample:

| at 7.50: | 32.9% $COF_2$ | 8.45 | 43.1% $COF_2$ |
|---|---|---|---|
| | 34.3% HCl | | 42.7% HCl |
| | 5.5% $CO_2$ | | 6.1% $CO_2$ |
| | 8.6% R12 | | 6.5% R12 |
| | 0.3% $H_2O$ | | 0.8% R22 |
| | 18.4% R22 | 11.15 | 45.6% $COF_2$ |
| at 9.45 | 44.6% $COF_2$ | | 43.9% HCl |
| | 41.6% HCl | | 5.7% $CO_2$ |
| | 3.1% $CO_2$ | | 3.6% R12 |
| | 6.8% R12 | | 1.3% R22 |
| | 4.0% R22 | at 13.00 | 42.0% $COF_2$ |
| at 12.00 | 44.9% $COF_2$ | | 41.8% HCl |
| | 40.3% HCl | | 13.9% $CO_2$ |
| | 11.8% $CO_2$ | | 1.7% R12 |
| | 2.6% R12 | | 0.5% $H_2O$ |
| | 0.3% R22 | | |
| at 13.30 | 49.3% air ($O_2$) | | |
| | 44.0% R22 | | |
| | 2.2% HCl | | |
| | 2.2% $CO_2$ | | |
| | 2.0% $COF_2$ | | |
| | 0.2% $H_2O$ | | |

Experiment 3

Batch: 0.5 mol of R22/h
  0.5 mol of $O_2$/h
  a small amount of $Cl_2$

Procedure: lamp output at 500 watts

| Sample and time (7:45 start) | R22 (in g) | R22 mol/h | Cl2 (in g) | Cl2 mol/h | O2 (in g) | O2 mol/h | Residence time in the reactor (in min) |
|---|---|---|---|---|---|---|---|
| 08:45 | 61.9 | 0.7 | 4.7 | 0.07 | 16.3 | 0.5 | 1.14 |
| 09:45 | 118.8 | 0.7 | 8.6 | 0.06 | 33 | 0.5 | 1.15 |
| 11:15 | 205.7 | 0.7 | 12.5 | 0.04 | 58.8 | 0.5 | 1.17 |
| 11:45 | 242.6 | 0.9 | 12.7 | 0.006 | 65.6 | 0.4 | 1.11 |

Analysis Evaluation (all Analyses Calculated Without Air):
Sample:

| at 8.45: | 43.6% $COF_2$ | at 9.45: | 46.0% $COF_2$ |
|---|---|---|---|
| | 42.3% HCl | | 43.2% HCl |
| | 10.7% $CO_2$ | | 6.9% $CO_2$ |
| | 1.7% R12 | | 1.2% R12 |
| | 1.0% R22 | | 2.2% R22 |
| | 0.6% $H_2O$ | | 0.6% $H_2O$ |
| at 11.15 | 36.7% $COF_2$ | at 11.45 | 41.7% $COF_2$ |
| | 38.4% HCl | | 40.7% HCl |
| | 8.4% $CO_2$ | | 7.2% $CO_2$ |
| | 0.9% R12 | | 0.9% R12 |
| | 15.4% R22 | | 9.3% R22 |
| | 0.2% $H_2O$ | | 0.3% $H_2O$ |

EXAMPLE 2

Preparation of Fluorophosgene ($COF_2$) by Photochemical Reaction (with Quartz Glass Cooling Finger and Without $Cl_2$)

Experimental Procedure and Setup

The reaction chamber used was a reactor manufactured from Duran glass and having a capacity of 580 ml, which had a cooling finger manufactured from quartz and a lamp shaft (quartz glass). The gas was introduced through a glass frit which was at the bottom of the reactor. The high-pressure mercury vapour radiator was cooled with compressed air. At the start of the experiment, the compressed air cooling was first switched on and then the lamp was ignited. After approx. 10 min, the radiator had attained its output. HCFC-22 was first introduced into the reactor and then the oxygen was switched on.

The two gases were then metered in simultaneously in a certain ratio and passed through the reactor chamber. The resulting product gas stream was analyzed.

Experiment 2.1

Batch: 0.5 mol of R22/h
  0.4 mol of $O_2$/h

Procedure: lamp output at 500 watts

| Sample and time (9:00 start) | R22 (in g) | R22 mol/h | O2 (in g) | O2 mol/h | Residence time in the reactor (in min) |
|---|---|---|---|---|---|
| 09:30 | 29.5 | 0.68 | 11.5 | 0.70 | 1.05 |
| 10:00 | 43.8 | 0.51 | 19.0 | 0.59 | 1.32 |
| 10:30 | 62.5 | 0.43 | 26.0 | 0.44 | 1.67 |
| 11:00 | 83.6 | 0.49 | 35.0 | 0.56 | 1.38 |
| 11:30 | 102.3 | 0.43 | 40.0 | 0.31 | 1.96 |
| 12:00 | 120.2 | 0.41 | 45.5 | 0.34 | 1.93 |
| 13:00 | 157.1 | 0.43 | 55.5 | 0.31 | 1.96 |
| 13:30 | 176.3 | 0.44 | 61.0 | 0.34 | 1.86 |

Analysis Evaluation:

Sample:

| | | | | |
|---|---|---|---|---|
| at 9.30 | 56.2% $O_2$ | 10.00 | 38.8% $COF_2$ | |
| | 15.6% $COF_2$ | | 34.7% HCl | |
| | 9.7% HCl | | 7.7% $CO_2$ | |
| | 1.3% $CO_2$ | | 14.2% R22 | |
| | 16.6% R22 | | 0.4% $H_2O$ | |
| | 0.4% $H_2O$ | | 3.7% COFCl | |
| | 0.24% COFCl | | 0.6% R12 | |
| at 10.30 | 35.9% $COF_2$ | | 0.04% $COCl_2$ | |
| | 31.3% HCl | at 11.00 | 35.4% $COF_2$ | |
| | 6.1% $CO_2$ | | 32.3% HCl | |
| | 21.4% R22 | | 7.1% $CO_2$ | |
| | 0.2% $H_2O$ | | 18.6% R22 | |
| | 4.5% COFCl | | 5.7% COFCl | |
| | 0.6% R12 | | 0.8% R12 | |
| | 0.05% $COCl_2$ | | 0.07% $COCl_2$ | |
| at 11.30 | 33.6% $COF_2$ | at 12.00 | 31.2% $COF_2$ | |
| | 33.7% HCl | | 29.9% HCl | |
| | 8.1% $CO_2$ | | 7.9% $CO_2$ | |
| | 18.6% R22 | | 24.4% R22 | |
| | 5.7% COFCl | | 5.7% COFCl | |
| | 0.7% R12 | | 0.9% R12 | |
| | 0.1% $COCl_2$ | | 0.1% $COCl_2$ | |
| at 13.00 | 30.9% $COF_2$ | at 13.30 | 27.1% $COF_2$ | |
| | 28.0% HCl | | 30.4% HCl | |
| | 6.8% $CO_2$ | | 11.5% $CO_2$ | |
| | 27.3% R22 | | 23.5% R22 | |
| | 0.2% $H_2O$ | | 6.4% COFCl | |
| | 5.9% COFCl | | 1.0% R12 | |
| | 0.7% R12 | | 0.2% $COCl_2$ | |
| | 0.1% $COCl_2$ | | | |

The examples demonstrate that particularly good yield and conversion are achieved in the case of performance in the presence of chlorine and with light whose relatively short-wavelength fraction ($\lambda$<280 nm) has been filtered out.

EXAMPLE 3

Preparation of $C(O)F_2$ with a Molar Ratio of HCFC-22 to $O_2$ of 1:0.8

In the above-described reactor with capacity approx. 580 ml, HCFC-22, $O_2$ and $Cl_2$ were fed in with a throughput of 1.0 mol/h of HCFC-22, 0.8 mol/h of $O_2$ and 0.06 mol/h of $Cl_2$, so as to give rise to a residence time of about 1 min, and reacted with one another at 50° C.

A repeat of the experiment was undertaken with a throughput of 0.8 mol/h of HCFC-22, 0.64 mol/h of $O_2$ and 0.05 mol/h of $Cl_2$.

With good conversion, a selectivity of approx. 99.0 to 99.3% of $C(O)F_2$ was attained.

The carbonyl fluoride can be isolated by customary methods, for example by low-temperature distillation or pressure distillation.

The invention claimed is:

1. A process for preparing $C(O)F_2$ which comprises photooxidizing a reaction mixture comprising $CHClF_2$ or $CHF_3$ with oxygen and wherein at least some of the radiation is in the range from 280 nm to about 750 nm and wherein 0.05 to 0.20 mol of elemental chlorine is present per mole of $CHClF_2$ or $CHF_3$.

2. The process according to claim 1, wherein the irradiation is undertaken in the absence of chlorine and the incident light have wavelengths including <280 nm, or in that the irradiation is undertaken in the presence of elemental chlorine with light of a wavelength of >280 nm, in which case not more than 0.50 mol of elemental chlorine is present in the reaction mixture per mole of $CHClF_2$ or $CHF_3$.

3. The process according to claim 1, wherein the irradiation is carried out at a temperature of 20 to 300° C.

4. The process according to claim 1, wherein the irradiation is carried out at a pressure of 1 to 11 bar (abs.).

5. The process according to claim 1, wherein the reactants are present in gaseous form.

6. The process according to claim 1, wherein the reaction is carried out continuously.

7. The process according to claim 6, wherein the average residence time in the reactor is between 0.1 and 3 minutes.

8. The process according to claim 1, wherein $CHClF_2$ is used as the starting compound.

9. The process according to claim 1, wherein the irradiation is carried out at a temperature of 30 to 300° C.

10. The process according to claim 1, wherein the irradiation is carried out at a temperature of 50 to 90° C.

11. A process for preparing $C(O)F_2$ which comprises photooxidizing a reaction mixture comprising $CHClF_2$ or $CHF_3$ with oxygen and wherein at least some of the radiation is in the range from 280 nm to about 750 nm and a ratio of $CHClF_2$ or $CHF_3$ to oxygen content is 1:0.4 to 1:1.

12. The process as claimed in claim 1, wherein if $CHClF_2$ is used, the content in the reaction mixture of $CHClF_2$ is at least 5 mol %.

13. The process as claimed in claim 11, wherein if $CHClF_2$ is used, the content in the reaction mixture of $CHClF_2$ is at least 10 mol %.

14. The process according to claim 11, wherein 0.05 to 0.20 mol of elemental chlorine is present per mole of $CHClF_2$ or $CHF_3$.

15. The process as claimed in claim 1, wherein the ratio of $CHClF_2$ or $CHF_3$ to oxygen is from 1:0.4 to 1:1.

16. A process for preparing $C(O)F_2$ which comprises photooxidizing a reaction mixture comprising $CHClF_2$ or $CHF_3$ with oxygen and wherein at least some of the radiation is in the range from 280 nm to about 750 nm and wherein 0.01 to 0.50 mol of elemental chlorine is present per mole of $CHClF_2$ or $CHF_3$.

* * * * *